(12) United States Patent
Saito et al.

(10) Patent No.: US 9,004,291 B2
(45) Date of Patent: Apr. 14, 2015

(54) FLUID FILTER

(75) Inventors: Yasuhiro Saito, Tokoname (JP);
Haruaki Sakata, Nisshin (JP); Toshiaki Mori, Kariya (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 418 days.

(21) Appl. No.: 13/523,002

(22) Filed: Jun. 14, 2012

(65) Prior Publication Data

US 2013/0008845 A1 Jan. 10, 2013

(30) Foreign Application Priority Data

Jul. 4, 2011 (JP) ................................. 2011-148635

(51) Int. Cl.
| | | |
|---|---|---|
| *B01D 29/07* | (2006.01) | |
| *B01D 46/00* | (2006.01) | |
| *B01D 46/10* | (2006.01) | |
| *B01D 46/52* | (2006.01) | |

(52) U.S. Cl.
CPC ............ *B01D 29/07* (2013.01); *B01D 46/0002* (2013.01); *B01D 46/10* (2013.01); *B01D 46/521* (2013.01); *B01D 46/523* (2013.01); *B01D 2201/127* (2013.01)

(58) Field of Classification Search
None
See application file for complete search history.

(56) References Cited

U.S. PATENT DOCUMENTS

| | | | | |
|---|---|---|---|---|
| 4,187,182 A | * | 2/1980 | Rosenberg | .................... 210/445 |
| 2002/0036165 A1 | | 3/2002 | Sommer et al. | |
| 2008/0060987 A1 | * | 3/2008 | Goto | ............................ 210/231 |
| 2011/0259810 A1 | * | 10/2011 | Sakata et al. | .................. 210/358 |
| 2012/0073254 A1 | | 3/2012 | Konno et al. | |

FOREIGN PATENT DOCUMENTS

| | | |
|---|---|---|
| CN | 2336849 | 9/1999 |
| JP | 06-343804 | 12/1994 |
| JP | 2002-273116 | 9/2002 |
| JP | 2004-353783 | 12/2004 |
| WO | 00/53285 | 9/2000 |
| WO | 2010/137085 | 12/2010 |

OTHER PUBLICATIONS

Chinese Office Action, dated Mar. 24, 2014, along with an english translation thereof.
Japan Office action, dated Oct. 14, 2014 along with an English translation thereof.

* cited by examiner

*Primary Examiner* — Benjamin Kurtz
(74) *Attorney, Agent, or Firm* — Greenblum & Bernstein P.L.C.

(57) ABSTRACT

A fluid filter including: an upper case member having a flow outlet; a lower case member having a flow inlet; a filter element having a folded filter material and a holding frame which holds the circumferential part of the filter material and is sandwiched between the upper case member and the lower case member; and a reinforcing member provided to extend in a direction crossing the ridge line direction of the folds of the filter material, the reinforcing member is provided in such a manner that, when the height of the folds is defined as h1, the lower end thereof is positioned above a position of 0.6 h1 from the upper end of the folds.

11 Claims, 12 Drawing Sheets

PRIOR ART

PRIOR ART

FLUID FILTER

CROSS-REFERENCE TO RELATED APPLICATIONS

The present application claims priority under 35 U.S.C. §119 of Japanese Application No. 2011-148635 filed on Jul. 4, 2011, the disclosure of which is expressly incorporated by reference herein in its entirety.

BACKGROUND OF THE INVENTION

1. Field of the Invention

The present invention relates to a fluid filter, more specifically, to a fluid filter which can ensure a filtration area while suppressing deformation of a filter material, thereby improving the filtration efficiency.

2. Description of the Related Art

Conventionally, as a fluid filter used for an automatic transmission of a vehicle and the like, for example, as shown in FIGS. 12A and 12B, a fluid filter including an upper case member 102 having a flow outlet 102a; a lower case member 103 having a flow inlet 103a; and a filter element 106 having a folded filter material 104 and a holding frame 105 which holds the circumferential part of the filter material 104 and is sandwiched between the cases 102 and 103 is generally known. Such fluid filters involved the problem, for example, that the filter material 104 is deformed by the pressure when a fluid passes therethrough so that the folds are in close contact, as shown in FIGS. 13A and 13B, resulting in a decrease in filtration area.

Therefore, in order to prevent the close contact between the folds, it is known to use a comb-like reinforcing member, a rib or the like to suppress deformation of the filter material (see, for example, Related Art 1).

[Related Art 1] JP-A-2004-353783

However, the comb-like reinforcing member, rib or the like for suppressing deformation of the filter material involved the problem that it is provided in close contact with or in abutment with the filter material, thereby causing a decrease in filtration area.

SUMMARY OF THE INVENTION

The present invention has been made in light of the above current situation, and an object thereof is to provide a fluid filter which can ensure a filtration area while suppressing deformation of a filter material, thereby improving the filtration efficiency.

One aspect of the present embodiments provides a fluid filter including: an upper case member having a flow outlet; a lower case member having a flow inlet; a filter element having a folded filter material and a holding frame which holds the circumferential part of the filter material and is sandwiched between the upper case member and the lower case member; and a reinforcing member provided to extend in a direction crossing the ridge line direction of the folds of the filter material, wherein the reinforcing member is provided in such a manner that, when the height of the folds is defined as h1, the lower end thereof is positioned above a position of 0.6 h1 from the upper end of the folds.

In a further aspect, the reinforcing member is provided separately from the filter material, and is formed in a comb-like shape to be inserted from above into the filter material.

In a further aspect, the filter element is formed with a rib provided in a substantially center part of the ridge line direction of the folds of the filter material, the rib provided to extend in the direction crossing the ridge line direction of the folds, and the reinforcing member is provided in a substantially intermediate position between the rib and the edge part on the folded side of the filter material on both sides of the rib.

In a further aspect, the fluid filter is used, during filtration, in the state where the inner pressure of a filtration chamber formed by the upper case member, the lower case member and the filter element is lower than external pressure, and the upper case member is formed with a convex part abutting on the upper end face of the rib when the upper case member is deformed by a change in pressure during filtration.

In a further aspect, the fluid filter is an automatic transmission oil filter.

The fluid filter of the present invention is arranged in such a manner that a reinforcing member for reinforcing a folded filter material is provided. This arrangement can suppress deformation of the filter material when a fluid passes therethrough, and can also suppress close contact between the folds of the filter material to cause a decrease in filtration area. Further, this reinforcing member is provided in such a manner that, when the height of the folds is defined as h1, the lower end thereof is positioned above a position of 0.6 h1 from the upper end of the folds. Such an arrangement can decrease the contact area between the folds and the reinforcing member as compared with the case where the reinforcing member is provided over the entire height of the folds. As a result, it is possible to ensure the filtration area while suppressing deformation of the filter material and to improve the filtration efficiency.

Moreover, in the case where the reinforcing member is provided separately from the filter material and is formed in a comb-like shape to be inserted from above into the filter material, a fluid filter which can ensure the filtration area while suppressing deformation of the filter material with a simple structure can be realized.

In addition, in the case where the filter element is formed with a rib provided in a substantially center part of the ridge line direction of the folds of the filter material, the rib provided to extend in a direction crossing the ridge line direction of the folds, and the reinforcing member is provided in a substantially intermediate position between the rib and the edge part on the folded side of the filter material on both sides of the rib, the reinforcing member and rib support the filter material at predetermined intervals in the ridge line direction of the folds, thereby making it possible to suppress deformation of the filter material in the ridge line direction of the folds.

Moreover, in the case where the fluid filter is used, during filtration, in the state where the inner pressure of a filtration chamber formed by the upper case member, the lower case member and the filter element is lower than external pressure, and the upper case member is formed with a convex part abutting on the upper end face of the rib when the upper case member is deformed by a change in pressure during filtration, excessive deformation of the upper case member can be suppressed. Thus, the volume of the filtration chamber can be ensured. As a result, it is possible to ensure a fluid flow channel inside the filtration chamber and to suppress an increase in pressure loss during passage of a fluid.

Further, in the case where the fluid filter is an automatic transmission oil filter, an automatic transmission which can suitably filter an oil can be realized.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE PREFERRED EMBODIMENTS

Figure 1:
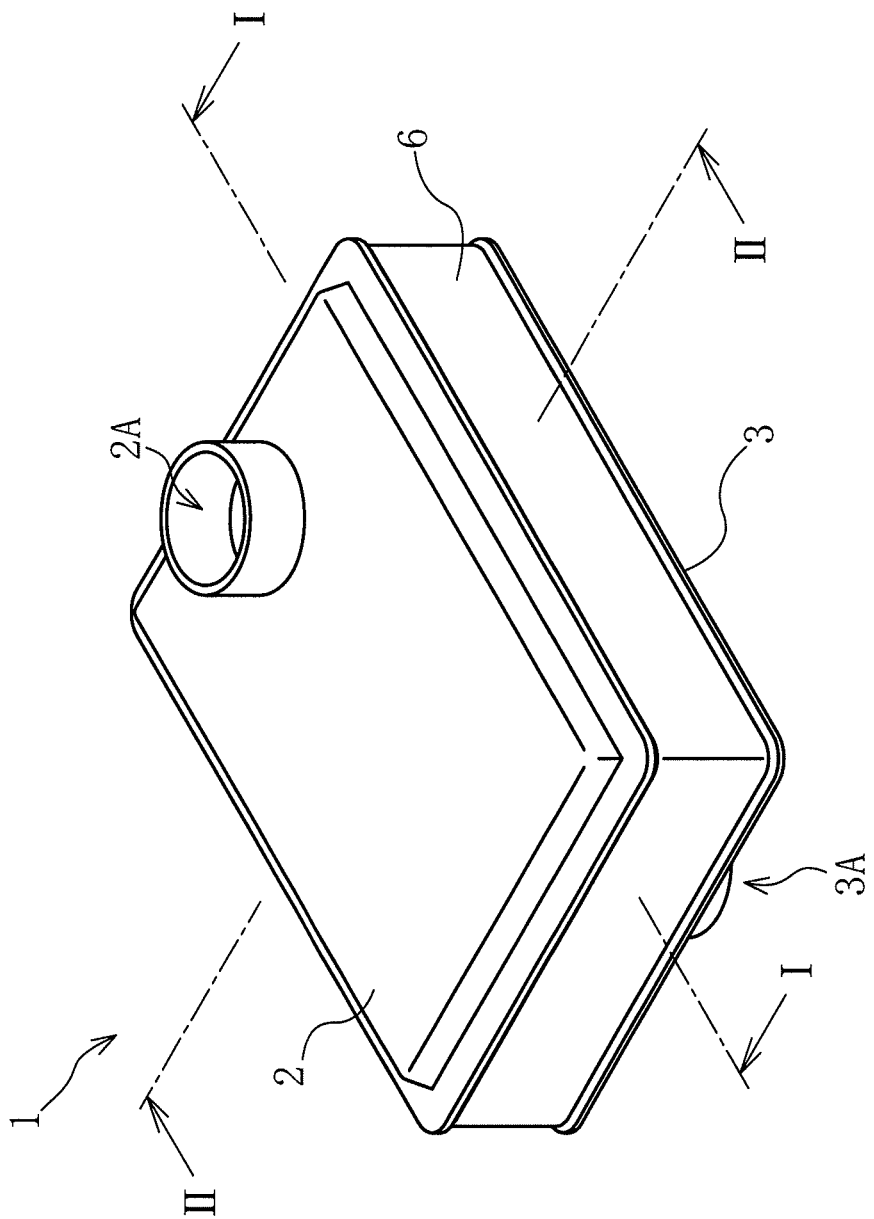
FIG. 1 is a perspective view of a fluid filter according to an Example.
Figure 2:
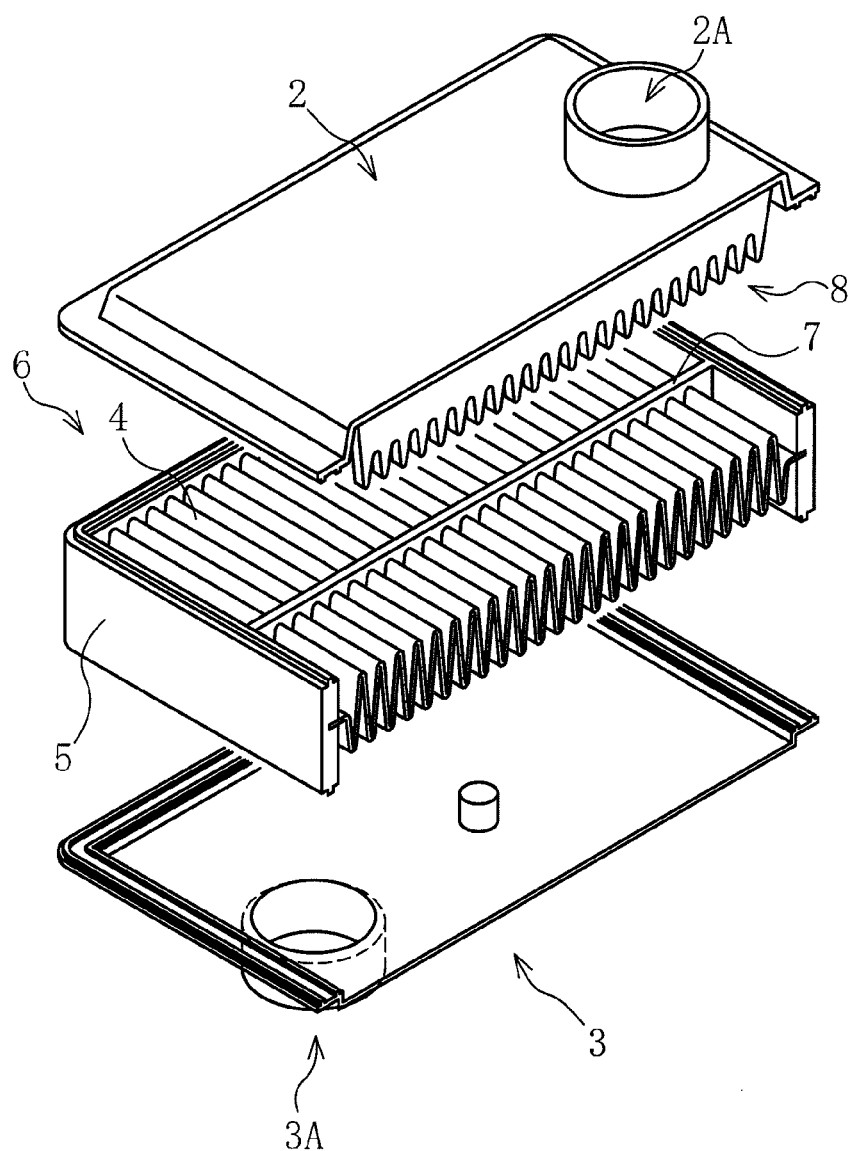
FIG. 2 is a partial sectional exploded perspective view of the fluid filter according to the Example.
Figure 3:
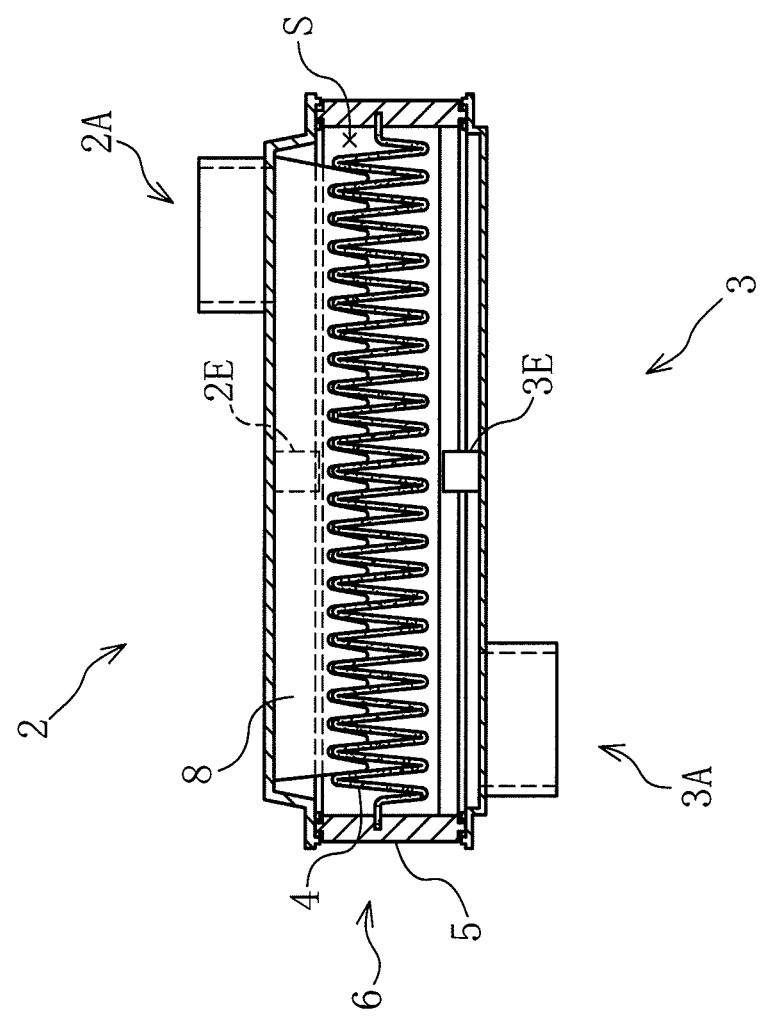
FIG. 3 is a sectional view taken along the line I-I in FIG. 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The fluid filter according to the present embodiment is a fluid filter (1) including an upper case member (2) having a flow outlet (2A); a lower case member (3) having a flow inlet (3A); a filter element (6) having a folded filter material (4) and a holding frame (5) which holds the circumferential part (4A, 4B) of the filter material and is sandwiched between the upper case member and the lower case member; and a reinforcing member (8) provided to extend in a direction crossing the ridge line direction of the folds of the filter material. Then, the reinforcing member is provided in such a manner that, when the height of the folds is defined as h1, the lower end of the reinforcing member is positioned above a position of 0.6 h1 from the upper end of the folds (see, for example, FIGS. 1 to 4). The intended use of this fluid filter is not especially limited, but, for example, can be an automatic transmission oil filter. The manner of use of this fluid filter is not especially limited, but is preferably such a manner that, during filtration, the fluid filter is used in the state where the inner pressure of a filtration chamber (S) formed by the upper case member, the lower case member and the filter element is lower than external pressure.

The structure, shape, size, material and the like of the "upper case member" are not especially limited. For example, the upper case member is formed in an open-bottomed box shape, and can have a ceiling wall (2B) and a circumferential side wall (2C) extending downward from the circumferential end of this ceiling wall (see, for example, FIG. 8). Further, a concave edge part (2D) with a concave cross section, intended to bond the case with the holding frame, can be formed in the lower end face of the circumferential side wall (see, for example, FIG. 8).

The structure, shape, size, material and the like of the "lower case member" are not especially limited. The lower case member is formed, for example, in an open-topped box shape, and can have a bottom wall (3B) and a circumferential side wall (3C) extending upward from the circumferential end of this bottom wall (see, for example, FIG. 9). Further, a concave edge part (3D) with a concave cross section, intended to bond the case with the holding frame, can be formed in the upper end face of the circumferential side wall (see, for example, FIG. 9).

The size, planar shape and the like of the "filter material" are not especially limited. The material for the filter material can include, for example, nonwoven fabrics, woven fabrics and paper.

The structure, size, shape and the like of the "holding frame" are not especially limited. The material for the holding frame can include, for example, resins and metals. The holding frame can have, for example, a pair of first wall parts (5A) which hold the edge part (4A) on the folded side of the filter material and a pair of second wall parts (5B) which continue to the first wall parts and hold the edge part (4B) on the non-folded side of the filter material (see, for example, FIGS. 5 to 7). These first and second wall parts usually have a height (h2) greater than the height (h1) of the folds of the filter material. A convex edge part with a convex cross section can be formed over the whole circumference on the upper and lower end faces of the first and second wall parts, respectively, (see, for example, FIGS. 5 to 7). The convex edge part can be engaged and bonded with the respective concave edge parts of the upper and lower case members.

The structure, shape, size and the like of the "filter element" are not especially limited. The filter element can have such a form that the holding frame made of a resin is formed in the circumferential part of the filter material, for example, by insert molding (see, for example, FIGS. 5 to 7).

The upper case member and the holding frame, and, the lower case member and the holding frame, respectively, can be bonded with each other. While the bonding form between these members is not especially limited, these members can be bonded, for example, by laser welding, vibration welding or adhesion. Especially when these members are bonded by laser welding, the materials for the upper and lower case members can be a laser-transmitting resin, and the material for the holding frame can be a laser-absorbing resin. Further, laser welding is preferred as causing no friction between the reinforcing member and the filter material during welding.

The structure, shape, size, number and the like of the "reinforcing member" are not especially limited. The form of the reinforcing member can include, for example, such a form that the reinforcing member provided separately from the filter material is inserted from above (see, for example, FIGS. 2 to 4) and such a form that the reinforcing member is preliminarily provided integrally with the filter material by insert molding and the like. The form when the reinforcing member is provided separately from the filter material can include, for example, (i) such a form that the reinforcing member is provided integrally with the upper case member (see, for example, FIG. 8), and (ii) such a form that the reinforcing member provided singly is attached to the holding frame or upper case member. The distance of the lower end position of the reinforcing member from the upper ends of the folds is preferably (0.6 to 0.1) h1, more preferably (0.5 to 0.3) h1 when the height of the folds of the filter material is defined as h1.

Figure 5:
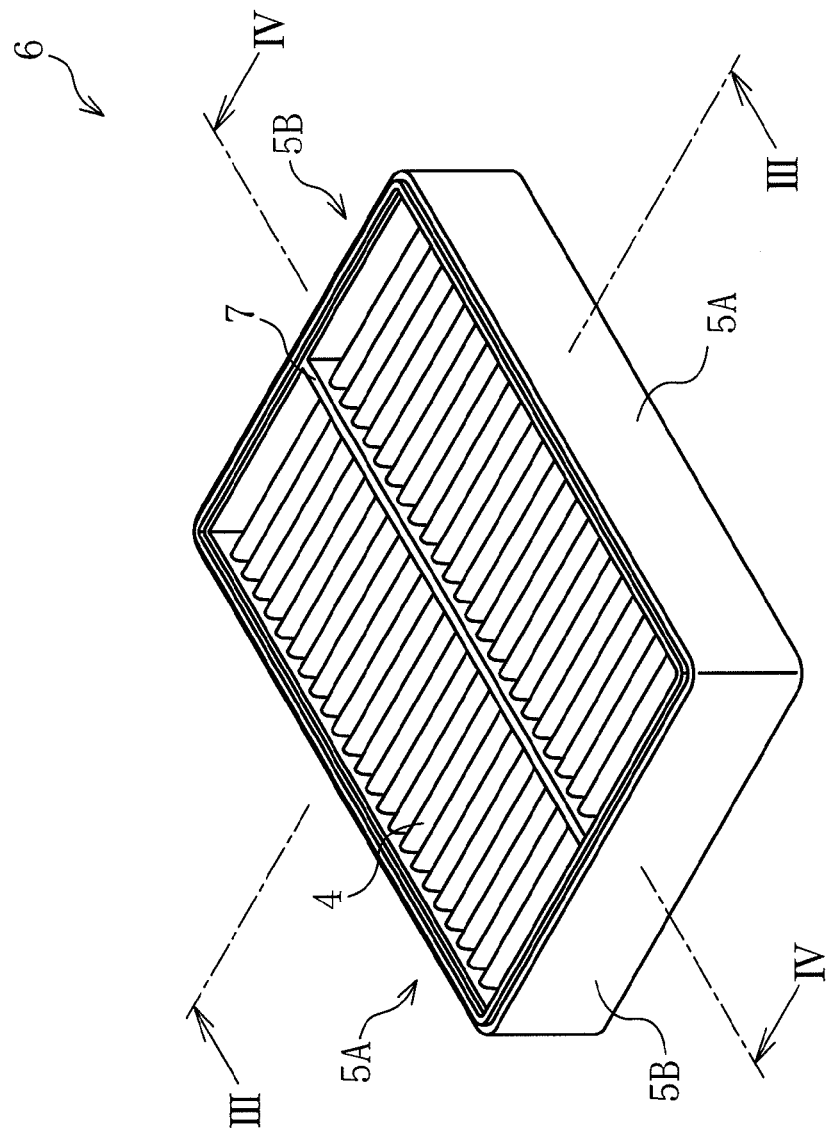
FIG. 5 is a perspective view of a filter element according to the Example.
Figure 6:
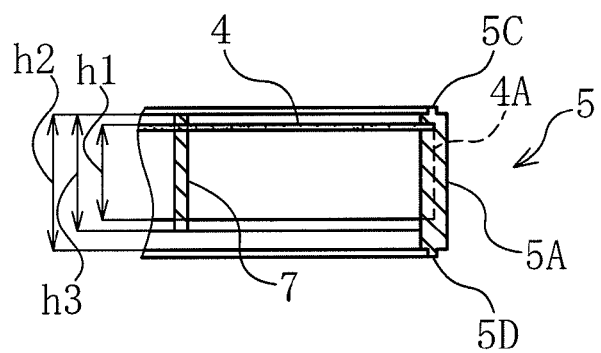
FIG. 6 is a sectional view taken along the line in FIG. 5.
Figure 7:
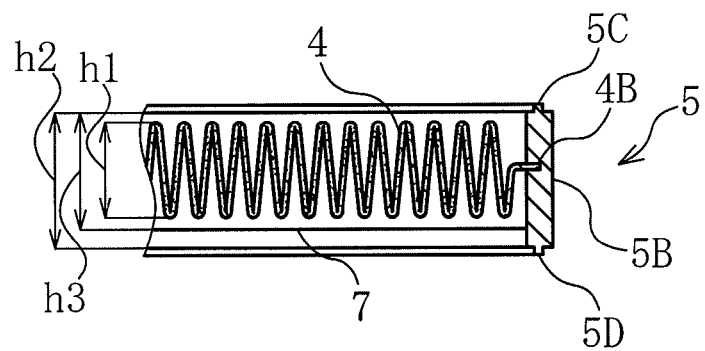
FIG. 7 is a sectional view taken along the line IV-IV in FIG. 5.

Here, the filter element can be formed with a rib (7) provided in a substantially center part of the ridge line direction of the folds of the filter material, the rib provided to extend in a direction crossing the ridge line direction of the folds (see, for example, FIGS. 5 to 7). The rib can be formed integrally with the holding frame, for example, by insert molding. Further, the rib is usually provided to extend downward from the height of the upper end of the holding frame. The height (h3) of the rib can be determined, for example, to be greater than the height (h1) of the folds of the filter material and to be smaller than the height (h2) of the holding frame (see, for example, FIGS. 6 and 7). The rib may be provided, for example, so that its lower end is positioned at a similar level to the position of the lower end of the reinforcing member. In this case, the rib can be said to be the reinforcing member.

Figure 4:
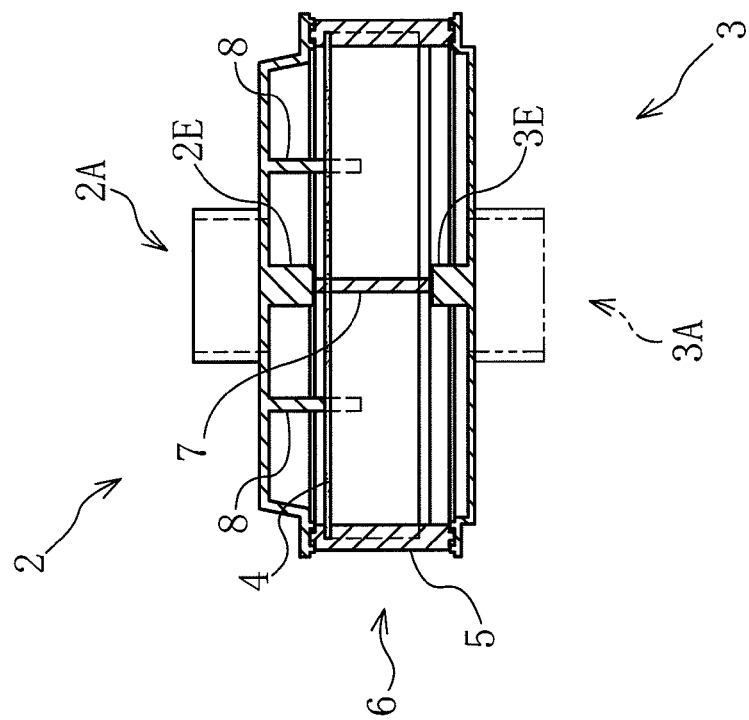
FIG. 4 is a sectional view taken along the line II-II in FIG. 1.

In the case when the above rib is formed, for example, the reinforcing member can be provided in a substantially intermediate position between the rib and the edge part on the folded side of the filter material on both sides of the rib in the fluid filter according to this embodiment (see, for example, FIG. 4).

Further, in the case when the above rib is formed, in the fluid filter according to this embodiment, for example, a convex part (2E, 3E) abutting on the upper or lower end face of the rib can be formed in at least one of the above upper and lower case members (see, for example, FIGS. 3, 4, 8 and 9). Thereby, when the fluid filter is used in the state where the inner pressure of the filtration chamber is lower than external pressure, the convex part abuts on the rib so that the deformation of the case members can be suppressed.

EXAMPLES

Hereinafter, the present invention will be explained in detail by way of an Example with reference to the drawings. In the present Example, an oil filter for use in an automatic transmission is exemplified as the "fluid filter" according to the present invention.

(1) Arrangement of the Oil Filter

An oil filter 1 according to the present Example includes an upper case member 2 having a flow outlet 2A, a lower case member 3 having a flow inlet 3A, a filter element 6 having a filter material 4 and a holding frame 5 which holds the circumferential part of the filter material 4 and is sandwiched between the upper case member 2 and the lower case member 3, as shown in FIGS. 1 to 4. In this Example, the upper case member 2 and lower case member 3, respectively, are made of a laser permeable resin, and the holding frame 5 is made of a laser absorbable resin. These members are bonded by laser welding.

The filter element 6 according to the Example is formed integrally with the filter material 4 and holding frame 5 by insert molding, as shown in FIGS. 5 to 7. The filter material 4 has a substantially rectangular shape as viewed from above and is formed in a folded shape. This holding frame 5 has a pair of first wall parts 5A holding the edge part 4A on the folded side in the circumferential part of the filter material 4, and a pair of second wall parts 5B continuing to these first wall parts 5A and holding the edge part 4B on the non-folded side of the filter material 4. These first and second wall parts 5A and 5B have a height h2 greater than the height h1 of the folds of the filter material 4. Convex edge parts 5C and 5D with a convex cross section are formed over the whole circumference of the upper and lower end faces of the first and second wall parts 5A and 5B, respectively. The convex edge parts 5C and 5D are engaged and welded with the respective concave edge parts of the upper case member 2 and the lower case member 3 described below. A filtration chamber S of the oil filter 1 is formed by the holding frame 5, upper case member 2 and lower case member 3.

In the Example, a rib 7 is provided in the filter element 6. This rib 7 is provided in a substantially center part of the ridge line direction of the folds of the filter material 4 to extend in a direction crossing the ridge line direction of the folds. The rib 7 is formed integrally with the holding frame 5, and both the ends thereof are connected to the pair of second wall parts 5B of the holding frame 5. Further, the rib 7 is provided at a height h3 to extend downward from the height of the upper end of the holding frame 5. The height h3 of this rib is determined to be greater than the height h1 of the folds of the filter material 4 and to be smaller than the height h2 of the holding frame 5.

Figure 8:
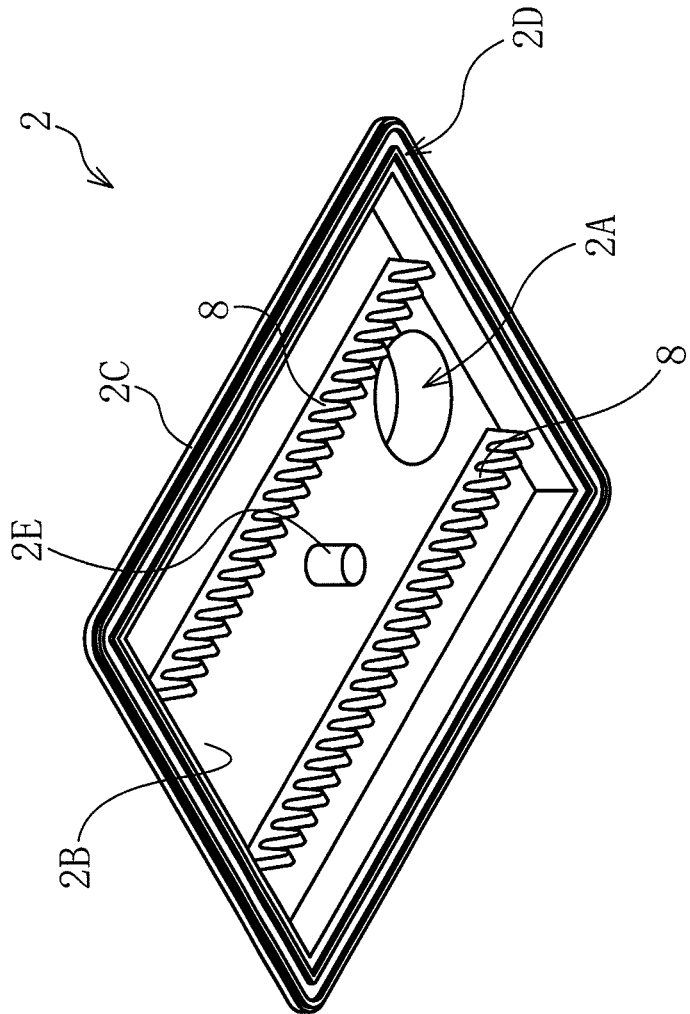
FIG. 8 is a perspective view when an upper case member according to the Example is viewed from the bottom face side.

As shown in FIG. 8, the upper case member 2 is formed in an open-bottomed box shape, and has a ceiling wall 2B and a circumferential side wall 2C extending downward from the circumferential end of the ceiling wall 2B. The upper case member 2 is provided with a flow outlet 2A in such a manner that the flow outlet penetrates through the ceiling wall 2B. A concave edge part 2D with a concave cross section is formed over the whole circumference in the lower end face of the circumferential side wall 2C. The concave edge part 2D is engaged and welded with the convex edge part 5C of the filter element 6.

The ceiling wall 2B is provided with two comb-like separators 8 as the reinforcing members according to the present invention. The separators 8 are projected downward from the ceiling wall 2B so that they are inserted from above the filter material 4. The two separators 8 are provided to be positioned on both the sides of the rib 7, and are respectively inserted into a substantially intermediate position between the first wall parts 5A holding the edge part 4A on the folded side of the filter material 4 and the rib 7. The separators 8 are provided so that their lower end is positioned above a position of 0.6 h1 from the upper end of the folds when the height of the folds is defined as h1.

Figure 9:
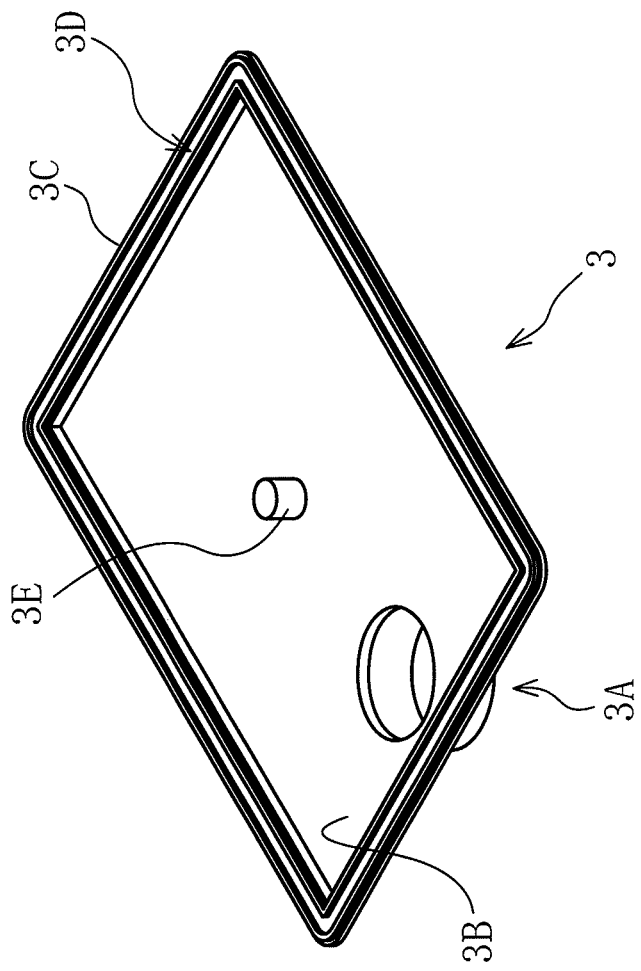
FIG. 9 is a perspective view of a lower case member according to the Example.

As shown in FIG. 9, the lower case member 3 is formed into an open-topped box shape, and has a bottom wall 3B and a circumferential side wall 3C extending upward from the circumferential end of this bottom wall 3B. The lower case member 3 is provided with a flow inlet 3A in such a manner that the flow inlet penetrates through the bottom wall 3B. A concave edge part 3D with a concave cross section is formed over the whole circumference in the upper end face of the circumferential side wall 3C. The concave edge part 3D is engaged and welded with the convex edge part 5D of the filter element 6.

Further, in the present Example, convex parts 2E and 3E are provided in the upper case member 2 and the lower case member 3, respectively. The convex parts 2E and 3E are formed in such a manner that they abut on the upper and lower end faces of the rib 7 when the upper and lower case members 2 and 3 are deformed by a change in pressure during filtration.

This arrangement can suppress excessive deformation of the upper and lower case members 2 and 3 to ensure the volume of the filtration chamber S.

(2) Functions of the Oil Filter

Next, the functions of the oil filter 1 having the above arrangement will be explained. The oil filter 1 is used in the state where it is immersed in an oil within an oil pan (not shown). An oil used on the automatic transmission side is pooled within the oil pan, and the flow inlet 3A opens to the inside of the oil pan so that the oil pooled within this oil pan can flow in therethrough. An oil pump (not shown) for supplying an oil to the automatic transmission is connected to the flow outlet 2A. The oil pooled within the oil pan flows into the filtration chamber S from the flow inlet 3A upon the operation of this oil pump, and is filtered by the filter material 4.

Figure 10:
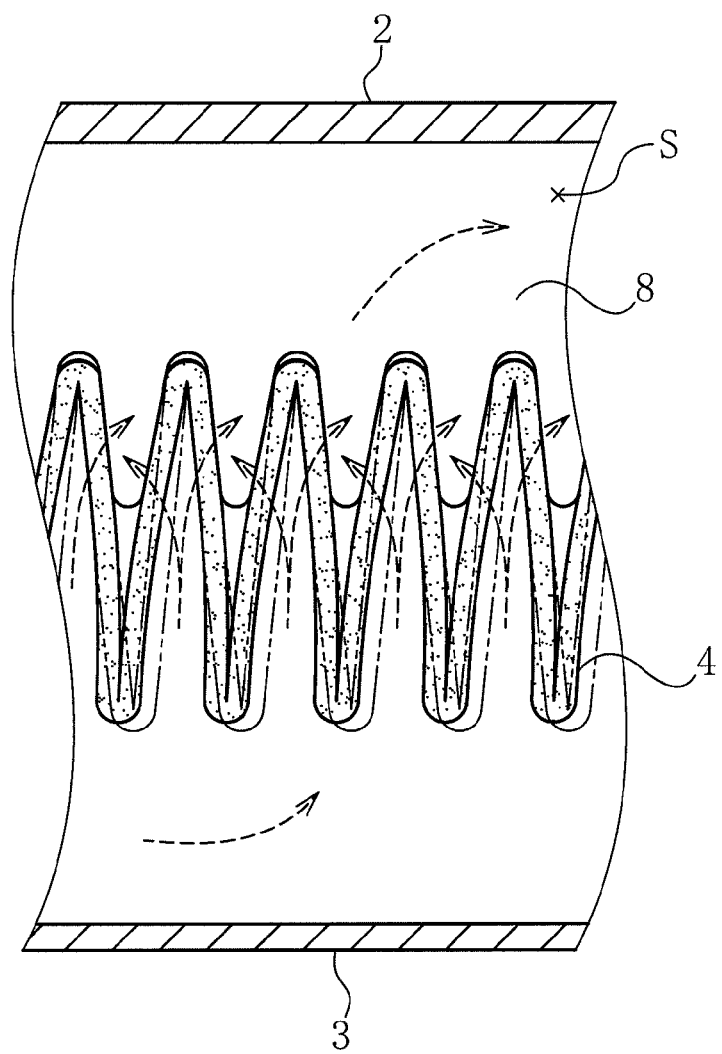
FIG. 10 is an explanatory view for explaining the function of the fluid filter according to the Example.

At this time, the filter material 4 is deformed by the pressure applied when the oil passes through the filter material 4, as shown in FIG. 10. However, the close contact between the folds is suppressed since the separator 8 is inserted into the filter material 4. The two separators 8 and rib 7 are provided so that they support the filter material 4 in the ridge line direction of the folds, and thus the deformation of the filter material 4 in the ridge line direction of the folds is suppressed as compared with the case where no separator or rib is provided. Further, the deformation of the upper and lower case members 2 and 3 due to the suction pressure of the oil pump is also suppressed by the convex parts 2E and 3E abutting on the rib 7.

The oil filtered through the filter material 4 in this manner is re-supplied to the automatic transmission via the flow outlet 2A.

(3) Effects of the Example

As described above, the separator 8 for reinforcing the folded filter material 4 is provided in the oil filter 1 of this Example. This arrangement can suppress deformation of the filter material 4 when an oil passes therethrough and suppress close contact between the folds of the filter material 4 leading to a reduction in filtration area. The separator 8 is provided in such a manner that, when the height of the folds is defined as h1, its lower end is positioned above a position of 0.6 h1 from the upper end of the folds. Thus, the contact area between the folds and the separator 8 can be reduced as compared with the case where the separator 8 is provided over the entire height of the folds. As a result, it is possible to ensure the filtration area while suppressing deformation of the filter material 4 and to improve the filtration efficiency.

In this Example, the separator 8 is provided separately from the filter material 4, and is formed in a comb-like shape to be inserted from above into the filter material 4, and thus realizes the oil filter 1 which can ensure the filtration area while suppressing deformation of the filter material 4 with a simple structure.

Further, in this Example, the filter element 6 is formed with the rib 7 provided in a substantially center part of the ridge line direction of the folds of the filter material 4, the rib 7 provided to extend in a direction crossing the ridge line direction of the folds. And the separator 8 is provided in a substantially intermediate position between the rib 7 and the edge part 4A of the filter material 4 on both sides of the rib 7. Therefore, deformation of the filter material 4 in the ridge line direction of the folds can be suppressed.

In this Example, the oil filter 1 is used in the state where the inner pressure of the filtration chamber S formed by the upper case member 2, the lower case member 3 and the filter element 6 is lower than external pressure. The upper case member 2 is formed with the convex part 2E abutting on the upper end face of the rib 7 when the upper case member 2 is deformed by a change in pressure during filtration, and the lower case member 3 is formed with the convex part 3E abutting on the lower end face of the rib 7 when the lower case member 3 is deformed by a change in pressure during filtration. Thus, it is possible to suppress excessive deformation of the upper and lower case members 2 and 3 and to ensure the volume of the filtration chamber S. As a result, fluid flow channels can be ensured in the filtration chamber S to suppress an increase in pressure loss during fluid passage.

Figure 11:
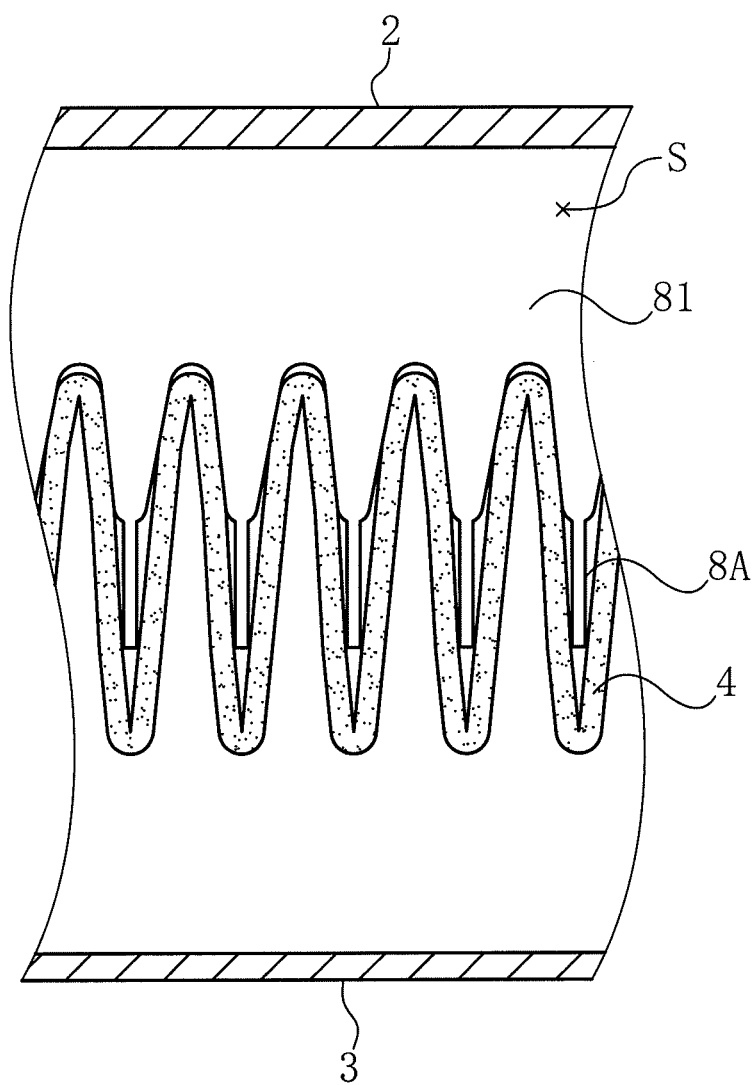
FIG. 11 is an explanatory view for explaining a fluid filter according to another embodiment.
Figure 12A:
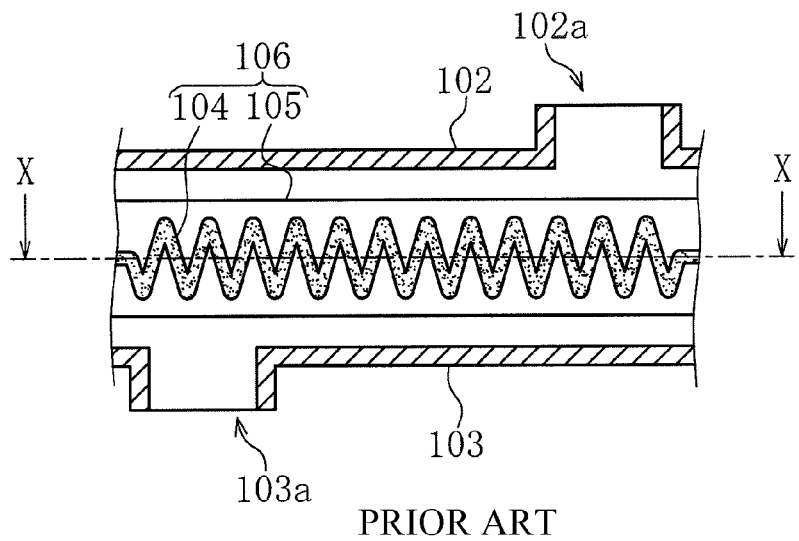
FIGS. 12A and 12B are explanatory views for explaining a conventional fluid filter, in which 12A is a vertical sectional view and 12B is a sectional view taken along the line X-X in 12A.
Figure 12B:
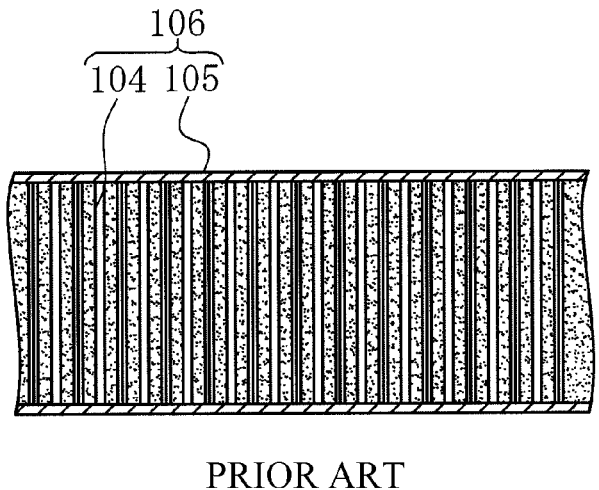
Figure 13A:
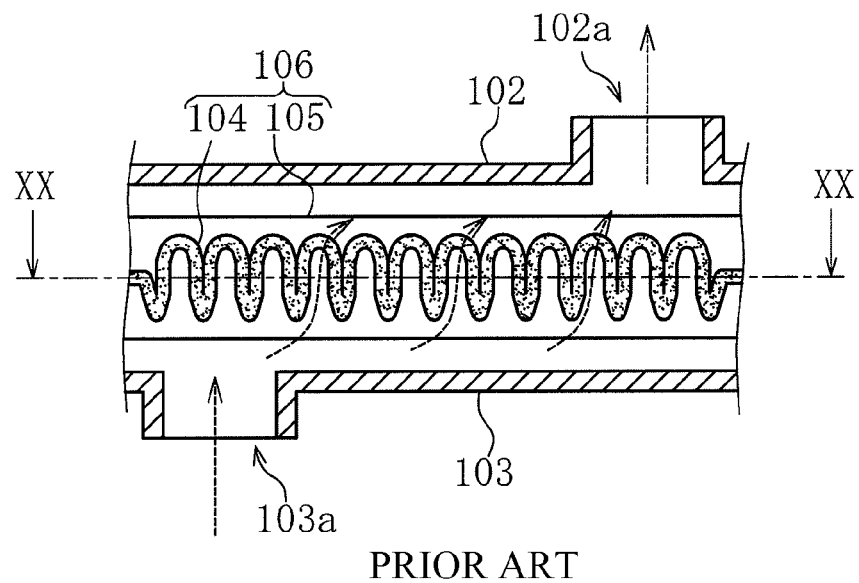
FIGS. 13A and 13B are explanatory views for explaining a conventional fluid filter, in which 13A is a vertical sectional view and 13B is a sectional view taken along the line XX-XX in 13A.
Figure 13B:
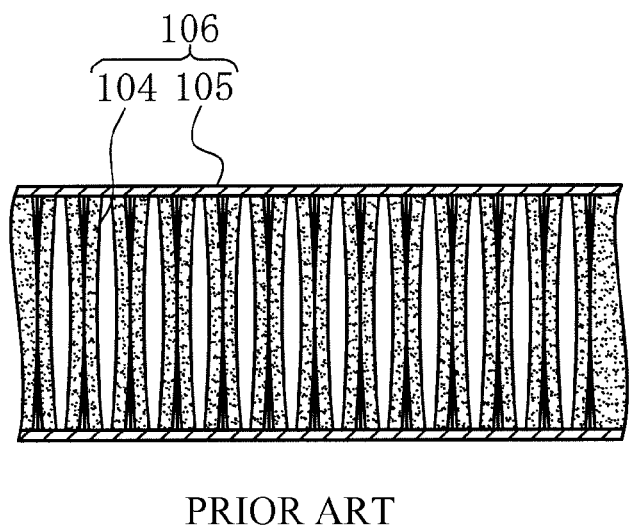

The present invention can include Examples variously modified within the scope thereof depending on the purpose and intended use, without any limitation to the above Example. Namely, the comb-like separator 8 provided in such a manner that, when the height of the folds is defined as h1, the lower end thereof is positioned above a position of 0.6 h1 from the upper end of the folds, is exemplified as the reinforcing member in the above Example. However, the reinforcing member is not limited to this, and may be, for example, a reinforcing member 81 provided with a rod-like part 8A which further extends downward from the lower end of the separator 8 in the above Example, as shown in FIG. 11. Such a rod-like part 8A, when provided, can further suppress deformation of the filter material 4 and can also ensure the filtration area.

The present invention is widely utilized as a fluid filtering technique. Especially, the present invention is suitably utilized as a fluid filter for an automatic transmission of vehicles including passenger cars, buses and trucks as well as rail vehicles such as railroad trains and steam trains, construction vehicles, agricultural vehicles and industrial vehicles.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A fluid filter comprising:
   an upper case member having a flow outlet;
   a lower case member having a flow inlet;
   a filter element having a folded filter material and a holding frame which holds the circumferential part of the filter material and is sandwiched between the upper case member and the lower case member;
   a reinforcing member extending in a direction transverse to the ridge line direction of the folds of the filter material and engaging the filter material from above the folds, the reinforcing member extending from one end of the filter material to an other end of the filter material, and
   a gap provided between the reinforcing member and an upper end of the folds when the reinforcing member is engaged with the filter material from above, wherein the reinforcing member is configured such that, when the height of the folds is defined as h1, the lower end of the reinforcing member is positioned above a position of 0.6 h1 from the upper end of the folds.

2. The fluid filter according to claim 1, wherein the reinforcing member is provided separately from the filter material, and has comb-like shape to be inserted from above into the filter material.

3. The fluid filter according to claim 2, wherein the filter element has a rib provided in a substantially center part of the ridge line direction of the folds of the filter material, the rib extending in the direction traverse to the ridge line direction of the folds, and the reinforcing member is provided in a substantially intermediate position between the rib and the edge part on the folded side of the filter material on both sides of the rib.

4. The fluid filter according to claim 3, wherein the fluid filter is used, during filtration, such that the inner pressure of a filtration chamber formed by the upper case member, the lower case member and the filter element is lower than external pressure, and the upper case member comprises a convex part abutting en the upper end face of the rib when the upper case member is deformed by a change in pressure during filtration.

5. The fluid filter according to claim 1, which is comprising an automatic transmission oil filter.

6. The fluid filter according to claim 1, the reinforcing member comprising a plurality of reinforcing ribs, each reinforcing rib positioned intermediate ends of the filter element and a center of the filter element in the direction transverse to the ridge line direction of the folds of the filter material.

7. The fluid filter according to claim 1, further comprising a rib integral with the holding frame and extending from one end of the holding frame to the other end of the holding frame in the direction transverse to the ridge line direction of the folds, the rib having a height greater than the height of the folds of the filter material and smaller than a height of the holding frame.

8. The fluid filter according to claim 7, further comprising a projection extending from at least one of the upper case member and the lower case member, the projection positioned to confront an end face of the rib.

9. The fluid filter according to claim 7, the reinforcing member comprising a plurality of reinforcing members each extending into a plurality of folds of the filter material on each side of the rib.

10. The fluid filter according to claim 7, the folded filter material and the holding frame together comprising an integral member.

11. The fluid filter according to claim 8, the projection comprising a generally cylindrical member.

* * * * *